United States Patent [19]

Monteith

[11] Patent Number: 4,985,148
[45] Date of Patent: Jan. 15, 1991

[54] IMPROVED SEPARATOR TANK CONSTRUCTION

[75] Inventor: Joseph G. Monteith, Mississauga, Canada

[73] Assignee: Fibresep Ltd., Ontario, Canada

[21] Appl. No.: 476,872

[22] Filed: Feb. 8, 1990

[51] Int. Cl.$^5$ ............................................. B01D 17/025
[52] U.S. Cl. .................................... 210/519; 210/532.1
[58] Field of Search ....................... 210/519, 521, 532.1, 210/538, 164, 535, 532.2, 428, 413

[56] References Cited

U.S. PATENT DOCUMENTS

| | | | |
|---|---|---|---|
| 942,907 | 12/1909 | Huff | 210/535 |
| 1,844,443 | 2/1932 | Schmidt | 210/428 X |
| 3,221,881 | 12/1965 | Weiler et al. | 210/532.2 X |
| 3,258,123 | 6/1966 | Fontaine | 210/519 X |
| 3,567,032 | 3/1971 | Kemper | 210/413 X |
| 4,127,488 | 11/1978 | Bell et al. | 210/519 |
| 4,136,010 | 1/1979 | Pilie et al. | 210/164 |
| 4,328,101 | 5/1982 | Broden | 210/532.1 X |
| 4,363,731 | 12/1982 | Filippi | 210/532.1 |

Primary Examiner—Richard L. Chiesa
Attorney, Agent, or Firm—Shoemaker and Mattare, Ltd.

[57] ABSTRACT

A separator tank for rainwater and waste-water includes a container defining an upwardly open chamber, with a lid to close the chamber. An inlet is at a first location and an outlet is at a second location. A passageway forms part of the container and communicates the inlet with the outlet. A first opening is adjacent the inlet and communicates the passageway with the chamber, while a second opening is adjacent the outlet, also communicating the passageway with the chamber. The passageway itself is sealed from communication with the chamber, except for the openings. A weir is provided within the passageway, disposed with respect to the first opening such that, under relatively low entry flow rates, all entering materials are contained by the weir and flow through the first opening and into the chamber. Under relatively high entry flow rates, the entering materials overflow the weir and are delivered by the passageway to the outlet.

10 Claims, 2 Drawing Sheets

4,985,148

IMPROVED SEPARATOR TANK CONSTRUCTION

This invention relates generally to separator tanks, sometimes called interceptors, adapted to receive primarily rainwater from a storm sewer or drain, and additionally to perform the function of separating and entrapping any oil- or gasoline-based materials and suspended solids that may enter, allowing the water fraction to discharge into municipal receiving sewers. Prior art devices of this kind are typically equipped with various baffles and chambers operating in such a way as to collect specific components of the waste fluid and separate them from others.

In this connection, reference may be had to U.S. Pat. No. 4,136,010, issued Jan. 23, 1979 to Pilie et al.

Other patents, only peripherally related to the subject matter of this specification, are as follows: U.S. Pat. No. 1,844,443, Schmidt, Feb. 9, 1932; U.S. Pat. No. 942,907, Huff, Dec. 14, 1909; U.S. Pat. No. 3,567,024, McCormick, Mar. 2, 1971; U.S. Pat. No. 3,221,881 Weiler et al Dec. 7, 1965.

GENERAL DESCRIPTION OF THIS INVENTION

Broadly stated, the purpose of the tank interceptor provided by this invention is to provide two distinct responses to two different operating conditions:

(1) When the materials entering the interceptor include discharge from a service station, garage, machine shop, factory or the like, or oil that has spilled accidentally, these non-aqueous materials are collected within the interceptor. The aqueous fraction is allowed to leave the interceptor and pass on to a storm sewer or the like, but the liquid fraction made up of oil or fat of animal, vegetable or mineral origin, gasoline and the like remains trapped within the interceptor until the same is pumped out. Further, any heavier-than-water materials sink to the bottom of the interceptor and are confined to a particular location from where they can also be pumped out at intervals.

(2) The interceptor of this invention is also adapted to deal with inflow resulting from heavy rain during a storm. Such inflow would typically be a combination of storm drainage from an adjacent industrial property, garage or the like, as well as inflow from storm drains adapted to catch rainwater. When a large quantity of rainwater arrives at the interceptor of this invention, the interceptor automatically diverts most of this flow directly to an outlet opening which passes it directly to a storm sewer. Only a portion of the flow of the incoming rainwater is allowed through the treatment/storage chamber of the interceptor.

More particularly, this invention provides a separator tank for rainwater and waste-water, comprising:

a container having a bottom and sidewall means defining an upwardly open chamber, and a lid closing said chamber, inlet means at a first location on said sidewall means, outlet means at a second location on said sidewall means, passageway means forming part of the container and communicating said inlet means with said outlet means, a first opening adjacent the inlet means, the first opening communicating the passageway means with said chamber, a second opening adjacent the outlet means, the second opening also communicating the passageway means with said chamber, the passageway means being sealed from communication with the chamber except for the said openings, and weir means within the passageway means, the weir means being disposed with respect to said first opening such that, under relatively low entry flow rates, all entering materials are contained by the weir and flow through the first opening and into the chamber, whereas under relatively high entry flow rates, a portion of the entering materials overflow the weir and are delivered by the passageway means to said outlet means.

BRIEF DESCRIPTION OF THE DRAWINGS

One embodiment of this invention is illustrated in the accompanying drawings, in which like numerals denote like parts throughout the several views, and in which.

DETAILED DESCRIPTION OF THE PREFERRED EMBODIMENT

The drawings illustrate a tank interceptor 9 which has somewhat the shape of an acorn. The interceptor 9 has a rounded, smooth lower wall 10 preferably made of plastic. The lower wall 10 is substantially part-spherical, thus curving smoothly downwardly and inwardly. At the lower portion thereof, the lower wall 10 adjoins a sludge collector portion 12 which is integral with the lower wall 10, but which is recessed downwardly below the lower wall 10 by virtue of a vertical wall offset 14. The provision of the sludge collector portion 12 allows the cleaning-out of the unit by inserting a snorkel down into the lower portion. The smooth converging lower wall 10 allows collected dirt and sludge to slide inwardly and downwardly into the sludge collector portion 12, whereas the offset 14 defines a perimeter or limit beyond which a flexible snorkel could not move. This facilitates the cleaning out of the unit.

Figure 3:
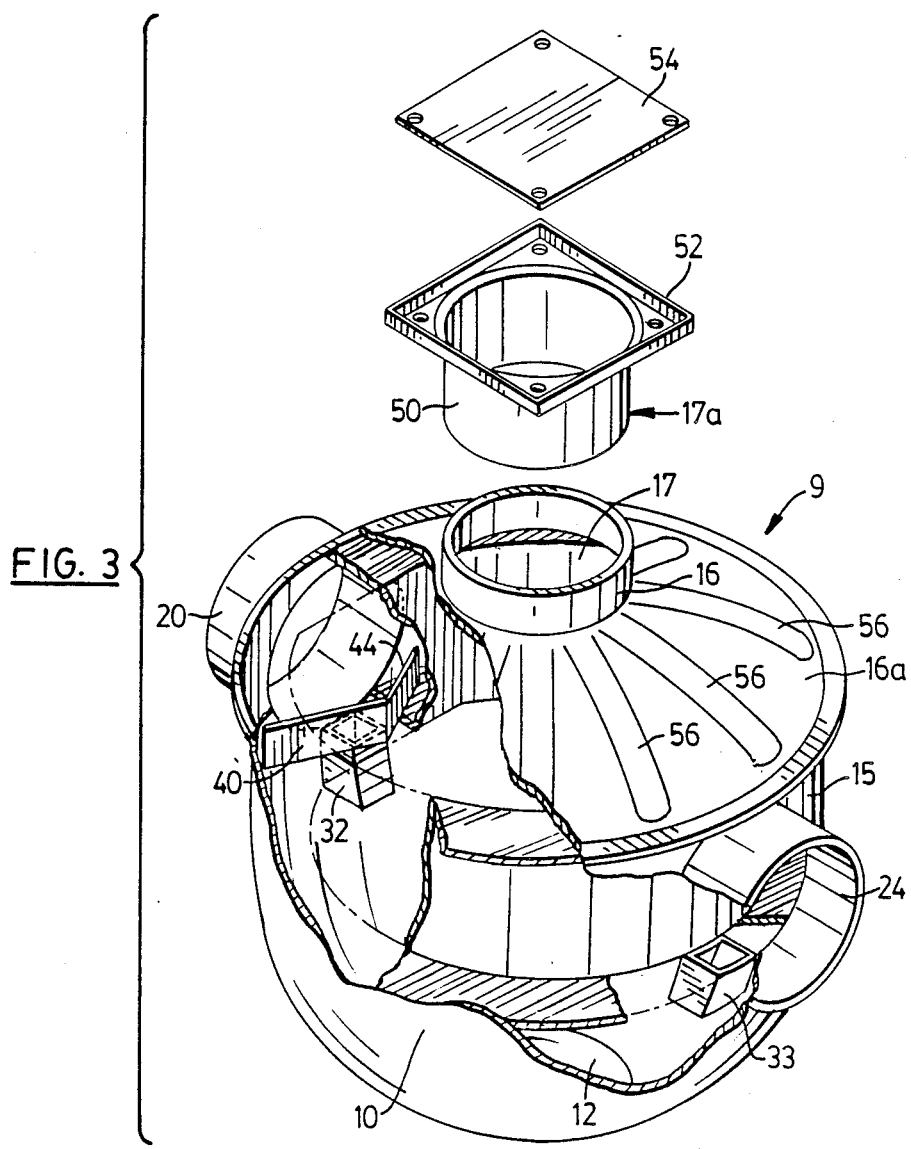
FIG. 3 is a partly broken-away and exploded view of the interceptor of FIG. 1.

The lower wall 10 merges at the top with a substantially cylindrical upper portion 15 (see FIG. 3) which is adapted to be closed at the top by a lid 16a which is shaped to be convex upwardly, and which has a central opening 17 defined by a cylindrical upstanding wall 16. As seen in FIG. 3, a manhole fitting 17a is provided, this being adapted to fit snugly outside the upstanding cylindrical wall 16. The fitting 17a will be described more fully at a later point in this disclosure.

Figure 1:
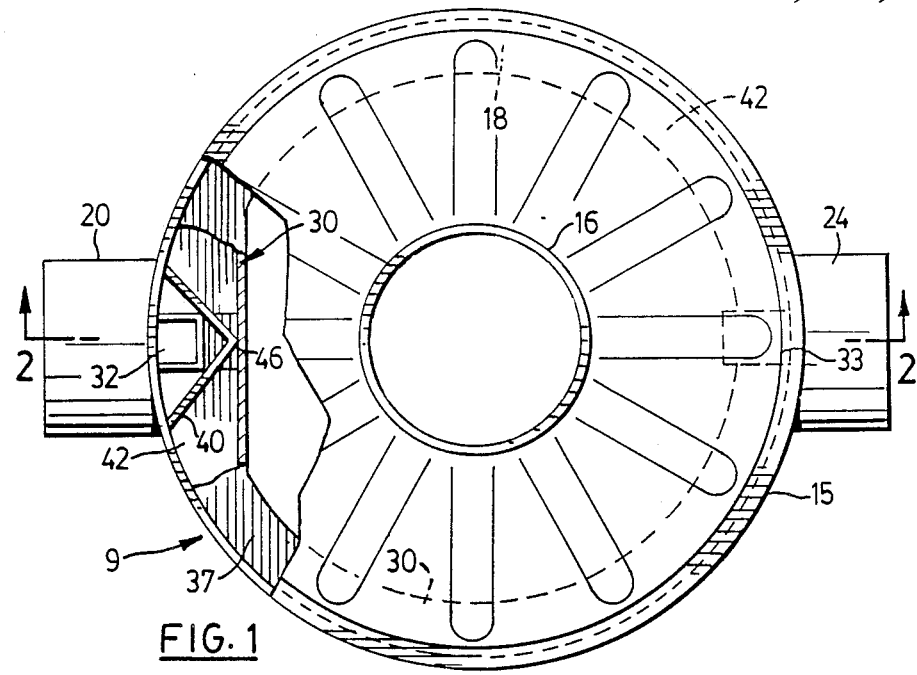
FIG. 1 is a plan view of an interceptor constructed in accordance with this invention.
Figure 2:
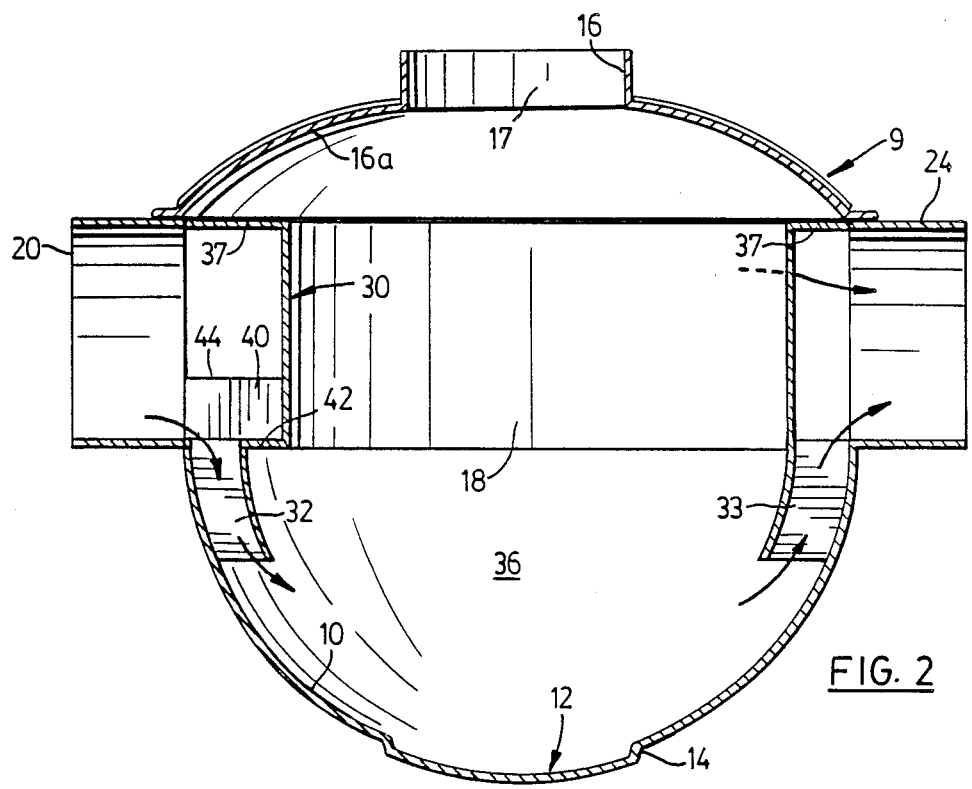
FIG. 2 is a vertical section view through the interceptor of FIG. 1, taken at the line 2—2 in FIG. 1.

As mentioned previously, the primary thrust of the present invention relates to the provision of bypass channel means for routing excessive flow of water through the unit in the case of a sudden downpour (i.e. rainwater). In FIG. 2, the bypass channel means is provided by a passageway 18 which links a circular inlet 20 with a circular outlet 24. As seen in FIG. 1, the passageway 18 is configured like an internal gallery within the cylindrical upper portion 15, but includes an expanded portion at the location 30. In the particular embodiment illustrated, any vertical cross-section through the passageway 18 would be rectangular. This means that the passageway 18 has a bottom wall 42 which is plan view has the annular shape of the portion shown in FIG. 1 between the broken line 30 and the cylindrical upper portion 15. It will be understood that the passageway 18 may have a cross-section other than rectangular.

Opening downwardly through the bottom wall 42 of the passageway 18 are two substantially upright conduits. The first is a conduit 32 which is positioned immediately adjacent the inlet 20 to the unit. The second is another substantially upright conduit 33, which opens into the passageway 18 immediately adjacent the outlet 24. Aside from the conduits 32 and 33, the passageway 18 is entirely separated and sealed off from the internal chamber or cavity 36 defined within the lower wall 10 and the upper portion 15 of the interceptor 9. In FIG. 2, the passageway 18 is covered at the top by a top wall 37. FIG. 2 shows that the conduits 32 and 33 are curved slightly to follow the contour of the lower wall 10.

A weir 40 is provided within the passageway 18, and is disposed with respect to the inlet 20 in such a way that, under relatively low entry flow rates, all entering materials are contained by the weir 40 and flow downwardly through the conduit 32 and into the chamber 36, whereas under relatively high entry flow rates (as during a flash storm) the excessive entering materials overflow the weir 40 and are delivered by the passageway 18 to the outlet 24.

More particularly, the weir 40 is in the form of a partition resembling an obtuse-angled V in plan, and extending upwardly from the bottom wall 42 of the passageway 18, to a location about 30% of the vertical height of the passageway 18. In FIG. 2, the top edge of the weir 40 is shown at 44. As can be seen in FIG. 1, the weir 40 extends from the cylindrical upper portion 15 of the interceptor on both sides of the inlet 20, to an apex location 46.

Attention is now directed to FIG. 3, for a more complete description of the fitting 17a. As can be seen, the fitting 17a includes a cylindrical wall 50 adapted to fit snugly but slidably over the wall 16 of the lid 16a. At the top of the wall 50, there is provided a rectangular frame 52 adapted to receive a grating 54 of a conventional nature. The interceptor 9 is intended to be buried below ground level, so as to allow liquids to flow by gravity into its interior, and it is desirable to set the vertical position of the unit in such a way that the grating 54 ends up flush with the ground level. In conditions where underground placement is not practical or possible, the interceptor 9 could be installed above ground, along with suitable pumping means capable of delivering the inflow to the inlet 20.

As best seen in FIG. 3, the lid 16a is provided with reinforcing ribs 56, for added strength.

In a preferred embodiment, the cross-sectional area of each of the conduits 32 and 33 is sized to restrict flow to the maximum design capacity of the interceptor chamber.

The use of the interceptor illustrated in the drawings will now be described. After installation and hook-up, the interceptor would be filled with clean water, up to about the level of the wall 42. The garage, service station or the like with which it is associated may produce a certain amount of waste-water mixed with oil, grit, etc., and this can find its way into the sewer which connects with the inlet 20. When there is no rain, the only material which could reach the interceptor would be that produced by the operation of the service station or the like. This flow, if any, will be relatively low, and will pass down the conduit 32 and begin to collect in the chamber 36. As aqueous and non-aqueous materials flow into the chamber 36, there will be some gravity flow of water through the conduit 33 and out the outlet 24. As more non-aqueous materials enter, the "oil layer" will continue to increase in thickness, but only water will pass through the conduit 33 and out the outlet 24. This condition will continue until the oil layer reaches a vertical thickness equivalent to the vertical dimension of the conduit 33.

From time to time, the grating 54 will be removed so that the unit can be inspected. If a large quantity of oil-based material has collected above the water in the interceptor, this can be pumped out.

Imagine now that a rainstorm occurs, and that suddenly the flow rate at which material is arriving at the interceptor 9 goes up by a factor of 20. This will certainly overflow the weir 40, and the entire overflow will pass along the closed portions of the passageway 18 to arrive at the outlet 24. It will be understood that the cross-section of the passageway 18 (both portions thereof) will be sized so as to be able to handle any reasonable flash flood of this kind. During the bypass of the torrent of rainwater, some of it will pass downwardly along the conduit 32, causing water already in the chamber 36 to be displaced upwardly along the conduit 33 and out the outlet 24. However, so long as the oil film covering the water in the chamber 36 is not thick enough to equal the vertical height of the conduit 33, only water or aqueous liquids will pass upwardly along the conduit 33 and out the outlet 24.

It will be understood from the above description that the unit shown in the figures is designed to prevent oil and solids from discharging into municipal receiving sewers. As such, the unit constitutes an important spill-containment device, capable of retaining oil and other lighter-than-water liquids securely stored within the unit in a way that prevents them from being flushed into the municipal receiving sewers. By sizing the unit with a diameter of approximately 6 feet, all parts roughly proportional to that shown in FIGS. 1 and 2, it will be capable of collecting and storing approximately three barrels (630 liters) of oil or oil-based liquid. It will be appreciated that other sizes can be constructed. A typical volume range would be from 600 liters to 1800 liters. It is preferred that the unit be constructed of fiberglass, due to its strength and relative cheapness. However, other materials could be utilized, as will be obvious to those skilled in the art. It is expected that the compactness and light weight of the unit will facilitate its installation. By utilizing fiberglass, the unit will be leak proof, corrosion proof and unaffected by frost.

In a preferred embodiment, the interior surface will be relatively smooth, thus preventing any build-up of oil and/or solids on the internal walls.

It will be understood that the device described above is intended primarily for installation in storm sewer systems. It also serves as an emergency spill containment device suitable for private, industrial and/or commercial properties, as well as a qualitative inspection device for environmental officers who may wish to learn quickly whether there has been a recent spill of liquid materials (oil, gasoline) which is unsuitable for the regular storm sewer system. The device described herein could also be used primarily as a treatment device for certain types of waste or solids producing operations, such as truck yards, chemical plants, scrap yards, and the like.

While one embodiment of this invention has been illustrated in the accompanying drawing and described hereinabove, it will be evident to those skilled in the art that changes and modifications may be made therein without departing from the essence of this invention, as set forth in the appended claims.

The embodiments of the invention in which an exclusive property of privilege is claimed are defined as follows:

1. A separator tank for rainwater and waste-water, comprising:

a container having a bottom and sidewall means defining an upwardly open chamber, and a lid closing said chamber, inlet means at a first location on said sidewall means, outlet means at a second location on said sidewall means, passageway means forming part of the container and communicating said inlet means with said outlet means, a first opening adjacent the inlet means, the first opening communicating the passageway means with said chamber, a second opening adjacent the outlet means, the second opening also communicating the passageway means with said chamber, the passageway means being sealed from communication with the chamber except for the said openings, and weir means within the passageway means, the weir means being disposed with respect to said first opening such that, under relatively low entry flow rates, all entering materials are contained by the weir and flow through the first opening and into the chamber, whereas under relatively high entry flow rates, a portion of the entering materials overflow the weir and are delivered by the passageway means to said outlet means.

2. The separator tank claimed in claim 1, in which the first opening comprises a first substantially upright conduit opening into the chamber, and in which the second opening comprises a second substantially upright conduit opening into the chamber.

3. The separator tank claimed in claim 1, in which the sidewall means is substantially circular in plan view, with a substantially cylindrical upper portion and a substantially part-spherical lower portion, the inlet means and the outlet means being in the upper portion at diametrically opposed locations, the passageway means including two branches extending around opposing sides of and within the sidewall means.

4. The separator tank claimed in claim 3, in which said lower portion merges into said bottom, the latter being constituted by a downwardly offset wall portion which is convex downwardly in order to act as a trap for grit and other heavy materials entering the tank.

5. The separator tank claimed in claim 1, in which the lid has a central aperture with a closure means for said central aperture, the aperture being large enough to allow access to said chamber for purposes of inspection and emptying.

6. The separator tank claimed in claim 1, in which said weir means comprises a partition within said passageway means, said partition closing off a lower part of said passageway means such that, under said relatively high entry flow rates, some of the entering materials can reach the outlet means by flowing over said partition.

7. The separator tank claimed in claim 6, in which the first opening comprises a first substantially upright conduit opening into the chamber, and in which the second opening comprises a second substantially upright conduit opening into the chamber.

8. The separator tank claimed in claim 7, in which the sidewall means is substantially circular in plan view, with a substantially cylindrical upper portion and a substantially part-spherical lower portion, the inlet means and the outlet means being in the upper portion at diametrically opposed locations, the passageway means including two branches extending around opposing sides of and within the sidewall means.

9. The separator tank claimed in claim 8, in which said lower portion merges into said bottom, the latter comprises a downwardly offset wall portion which is convex downwardly in order to act as a trap for grit and other heavy materials entering the tank.

10. The separator tank claimed in claim 9, in which the lid has a central aperture with a closure means for said central aperture, the aperture being large enough to allow access to said chamber for purposes of inspection and emptying.

* * * * *

(12) EX PARTE REEXAMINATION CERTIFICATE (5987th)
United States Patent
Monteith

(10) Number: US 4,985,148 C1
(45) Certificate Issued: Nov. 6, 2007

(54) SEPARATOR TANK CONSTRUCTION

(75) Inventor: Joseph G. Monteith, Mississauga (CA)

(73) Assignee: Stormceptor Corporation, Rockville, MD (US)

Reexamination Request:
No. 90/007,768, Oct. 19, 2005

Reexamination Certificate for:
Patent No.: 4,985,148
Issued: Jan. 15, 1991
Appl. No.: 07/476,872
Filed: Feb. 8, 1990

(51) Int. Cl.
*B01D 17/00* (2006.01)
*E03F 5/16* (2006.01)
*E03F 5/14* (2006.01)

(52) U.S. Cl. ..................... 210/519; 210/532.1
(58) Field of Classification Search ............ None
See application file for complete search history.

(56) References Cited

FOREIGN PATENT DOCUMENTS

GB 604083 11/1945

*Primary Examiner*—Jerry D. Johnson

(57) ABSTRACT

A separator tank for rainwater and waste-water includes a container defining an upwardly open chamber, with a lid to close the chamber. An inlet is at a first location and an outlet is at a second location. A passageway forms part of the container and communicates the inlet with the outlet. A first opening is adjacent the inlet and communicates the passageway with the chamber, while a second opening is adjacent the outlet, also communicating the passageway with the chamber. The passageway itself is sealed from communication with the chamber, except for the openings. A weir is provided within the passageway, disposed with respect to the first opening such that, under relatively low entry flow rates, all entering materials are contained by the weir and flow through the first opening and into the chamber. Under relatively high entry flow rates, the entering materials overflow the weir and are delivered by the passageway to the outlet.

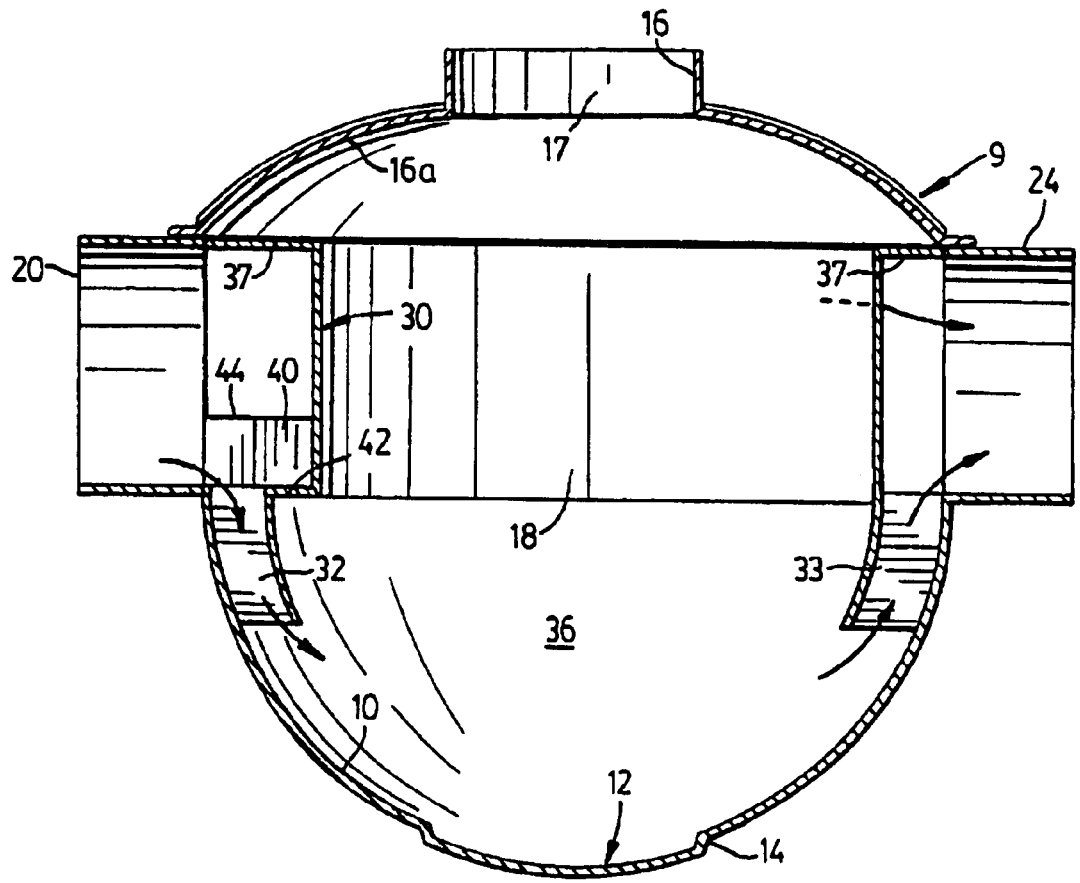

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 5 and 6 are cancelled.

Claims 2, 3 and 7 are determined to be patentable as amended.

Claims 4, 8, 9 and 10, dependent on an amended claim, are determined to be patentable.

2. [The separator tank claimed in claim 1, in which] *A separator tank for rainwater and waste-water, comprising:*
- *a container having a bottom and sidewall means defining an upwardly open chamber, and a lid closing said chamber,*
- *inlet means at a first location on said sidewall means,*
- *outlet means at a second location on said sidewall means,*
- *passageway means forming part of the container and communicating said inlet means with said outlet means,*
- *a first opening adjacent the inlet means, the first opening communicating the passageway means with said chamber,*
- *a second opening adjacent the outlet means, the second opening also communicating the passageway means with said chamber,*
- *the passageway means being sealed from communication with the chamber except for the said openings, and*
- *weir means within the passageway means, the weir means being disposed with respect to said first opening such that, under relatively low entry flow rates, all entering material are contained by the weir and flow through the first opening and into the chamber, whereas under relatively high entry flow rates, a portion of the entering materials overflow the weir and are delivered by the passageway means to said outlet means;*
- wherein the first opening comprises a first substantially upright conduit opening into the chamber, and [in which] the second opening comprises a second substantially upright conduit opening into the chamber.

3. [The separator tank claimed in claim 1, in which] *A separator tank for rainwater and waste-water, comprising:*
- *a container having a bottom and sidewall means defining an upwardly open chamber, and a lid closing said chamber,*
- *inlet means at a first location on said sidewall means,*
- *outlet means at a second location on said sidewall means,*
- *passageway means forming part of the container and communicating said inlet means with said outlet means,*
- *a first opening adjacent the inlet means, the first opening communicating the passageway means with said chamber,*
- *a second opening adjacent the outlet means, the second opening also communicating the passageway means with said chamber,*
- *the passageway means being sealed from communication with the chamber except for the said openings, and*
- *weir means within the passageway means, the weir means being disposed with respect to said first opening such that, under relatively low entry flow rates, all entering materials are contained by the weir and flow through the first opening and into the chamber, whereas under relatively high entry flow rates, a portion of the entering materials overflow the weir and are delivered by the passageway means to said outlet means;*
- wherein the sidewall means is substantially circular in plan view, with a substantially cylindrical upper portion and a substantially part-spherical lower portion, the inlet means and the outlet means being in the upper portion at diametrically opposed locations, the passageway means including two branches extending around opposing sides of and within the sidewall means.

7. [The separator tank claimed in claim 6, in which] *A separator tank for rainwater and waste-water, comprising:*
- *a container having a bottom and sidewall means defining an upwardly open chamber, and a lid closing said chamber,*
- *inlet means at a first location on said sidewall means,*
- *outlet means at a second location on said sidewall means,*
- *passageway means forming part of the container and communicating said inlet means with said outlet means,*
- *a first opeing adjacent the inlet means, the first opening communicating the passageway means with said chamber,*
- *a second opening adjacent the outlet means, the second opening also communicating the passageway means with said chamber,*
- *the passageway means being sealed from communication with the chamber except for the said openings, and*
- *weir means within the passageway means, the weir means being disposed with respect to said first opening such that, under relatively low entry flow rates, all entering materials are contained by the weir and flow through the first opening and into the chamber, whereas under relatively high entry flow rates, a portion of the entering materials overflow the weir and are delivered by the passageway means to said outlet means;*
- wherein said weir means comprises a partition within said passageway means, said partition closing off a lower part of said passageway means such that, under said relatively high entry flow rates, some of the entering materials can reach the outlet means by flowing over said partition; and
- wherein the first opening comprises a first substantially upright conduit opening into the chamber, and [in which] the second opening comprises a second substantially upright conduit opening into the chamber.

* * * * *